United States Patent [19]

Moon

[11] Patent Number: 4,948,939
[45] Date of Patent: Aug. 14, 1990

[54] LASER WELDING METHOD OF STEEL PLATE AND STEEL INGOT

[75] Inventor: Beom G. Moon, Seoul, Rep. of Korea
[73] Assignee: Goldstar Co., Ltd., Seoul, Rep. of Korea
[21] Appl. No.: 438,101
[22] Filed: Nov. 16, 1989
[30] Foreign Application Priority Data
  Nov. 30, 1988 [KR] Rep. of Korea ............... 15929/1988
[51] Int. Cl.$^5$ ............................................. B23K 26/00
[52] U.S. Cl. ............................ 219/121.64; 219/121.63
[58] Field of Search ....................... 219/121.63, 121.64, 219/121.65, 121.66, 121.74, 121.75

[56] References Cited

U.S. PATENT DOCUMENTS

| | | | |
|---|---|---|---|
| 4,341,942 | 7/1982 | Chaudhari et al. | 219/121.66 X |
| 4,424,435 | 1/1984 | Barnes, Jr. | 219/121.64 |
| 4,461,946 | 7/1984 | Kratschmer | 219/121.63 |
| 4,508,495 | 4/1985 | Monden et al. | 219/121.63 X |
| 4,685,202 | 8/1987 | Booth et al. | 219/121.72 X |

Primary Examiner—C. L. Albritton
Attorney, Agent, or Firm—Anthony J. Casella; Gerald E. Hespos

[57] ABSTRACT

A laser welding method of weldment, for the steel plates less than 1 mm thick, to make several through holes whose diameter is less than 1 mm, to fix the first weldment on the second weldment, and to irradiate laser beam of Nd-YAG laser generator through condensing lens and holes on the surface of the second weldment to be welded, on the other hand, for steel ingots more than 1 mm thick, to make narrow slit penetrating the first weldment, to fix the first weldment on the second weldment, and to irradiate $CO_2$ CW laser beam of $CO_2$ laser generator through condensing lens and the second weldment to be welded.

4 Claims, 4 Drawing Sheets

LASER WELDING METHOD OF STEEL PLATE AND STEEL INGOT

BACKGROUND OF THE INVENTION

This invention is related to the laser welding method of steel plate and steel ingot, in which the efficiency such as lessened laser power, reduction of laser irradiation time, distortion prevention of the weldment and high welding rigidity is maximized in comparision with the prior art. The prior laser welding methods are classified into two kinds according to the thickness of the steel.

As shown in FIG. 7, when the steel plates less than 1 mm thick are welded, two weldments (1) (2) are laid to put one upon the other in the shape of being welded and then laser beam is irradiated for a certain time only on the first weldment (1) (the upper one) with focussing on the second weldment (2) to weld the both weldments, i.e. steel plates.

When the steel ingots more than 1 mm thick are welded, as shown in FIG. 8, two weldments (4,5) are laid to put one upon the other in the shape of being welded and then high laser beam (3) is irradiated only on the edge along the junction face of the two weldments, i.e., steel ingots.

However in the laser welding of steel ingot in the prior art, the output of laser must be large, the irradiation time of laser is uneconomically long, and in the laser welding of steel plate, the thin steel plate is distorted on account of thermal expansion on the welded part, further more the welded part is cracked easily by the outside shock on account of low rigidity.

BRIEF DESCRIPTION OF THE DRAWINGS

These and other objects and advantages of the present invention will become clear from the following description with reference to the accompanying drawings wherein.

DETAILED DESCRIPTION OF THIS INVENTION

This invention provides to improve the defects of laser welding method of weldments like steel ingots and steel plates in the prior art.

Figure 1:
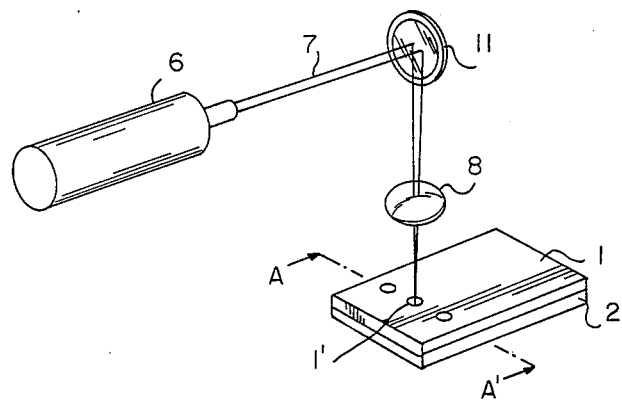
FIG. 1 is a perspective view of one laser welding status of steel plates according to this invention.
Figure 2:
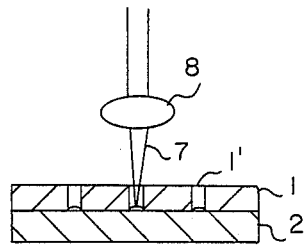
FIG. 2 is a sectional view of laser welding steel plates along A—A' line in FIG. 1.

When the steel plates are welded, as shown in FIG. 1, holes (1') of which diameter is less than 1 mm is pierced on the first weldment (1) (for example steel plate), the welding point of the second weldment (2) is fitted and fixed to the holes (1') and laser beam (7) of Nd-YAG laser generator (6) is irradiated with focussing on the holes (1') and contact part of the second weldment (2) (for example steel plate) to be welded through condensing hole (1') by means of condenser lens (8).

The unexplained numeral (11) is the reflecting mirror.

In accordance with the size of the welded steel plates and scope of welding area, the same welding method is executed in suitable number of places and the conjunction part of holes of the first weldment and the contact part of the second weldment are melted by the laser heat of the welding method according to this invention and the two weldments are welded.

At this time if the diameters of the holes are larger than 1 mm, the welding rigidity becomes low, because the parts being welded broaden with limited welding places.

Figure 3:
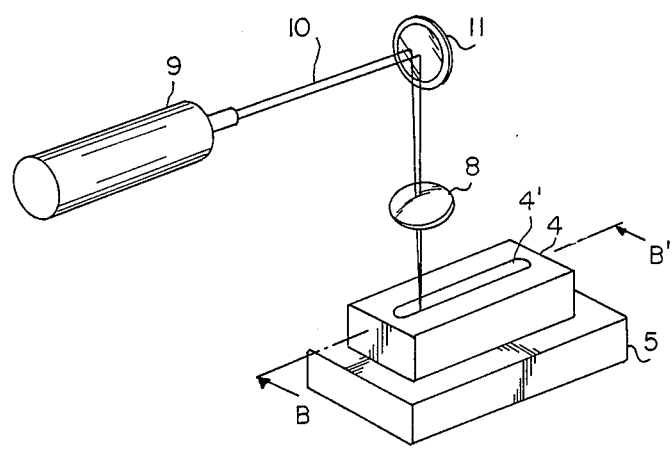
FIG. 3 is a perspective view of one laser welding status of steel ingots according to this invention.
Figure 4:
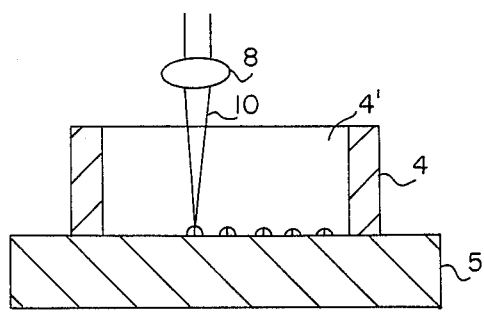
FIG. 4 is a sectional view of laser welding steel ingots along B—B' line in FIG. 3.
Figure 5:
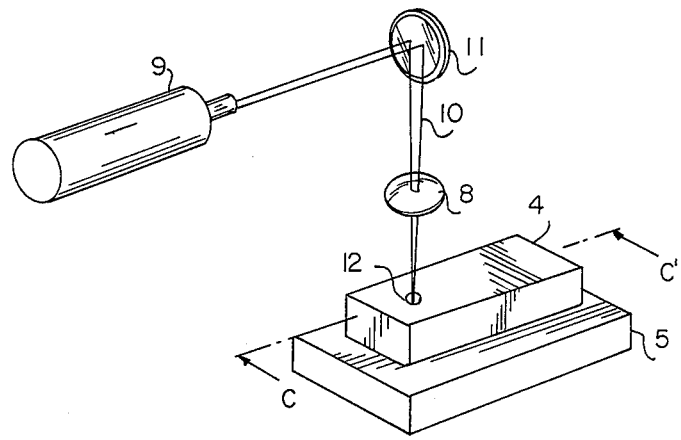
FIG. 5 is a perspective view of another laser welding status of steel ingots according to this invention.
Figure 6:
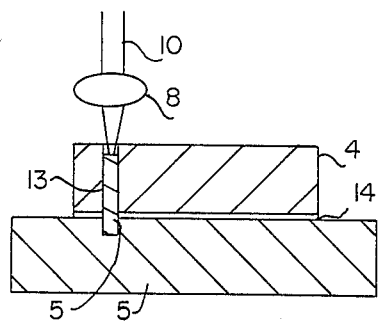
FIG. 6 is a sectional view of laser welding steel ingots along C—C' line in FIG. 5.
Figure 7:
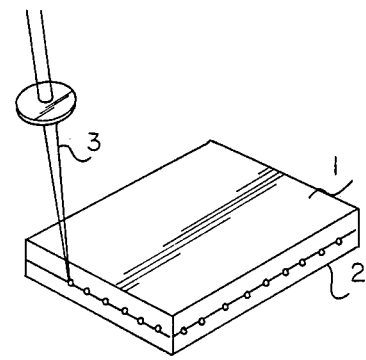
FIG. 7 is a perspective view of laser welding status of steel plates in the prior art.
Figure 8:
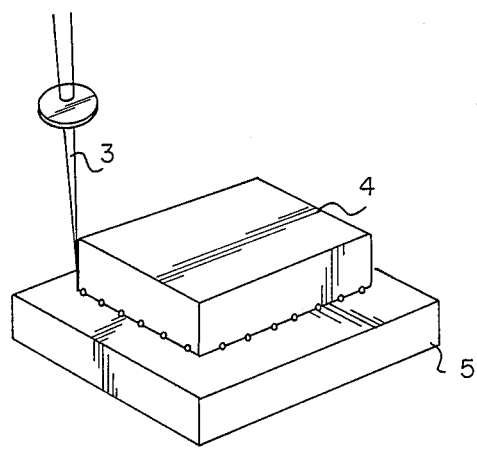
FIG. 8 is a perspective view of laser welding status of steel ingots in the prior art.

There are two welding methods of steel ingot. The first method as shown FIG. 3 is to make narrow slit (4') with the same length of the welding part and to fix the first weldment (4) (for example steel ingot) on the second weldment (5) (for example steel ingot) and to irradiate the $CO_2$ CW laser beam (10) from $CO_2$ laser generator (9) through condenser lens (8) and slit (4') to the junction part of the second weldment (5) and the above narrow slit (4'), and irradiating part of laser beam and its environs of the weldments (4,5) to be melted and welded. The second method is as shown in FIG. 5, is to make the through holes (12) on the first weldment (4) (for example steel ingot), to make the holes whose depth is about 10% of the thickness of the second weldment (5) (for example steel ingot) on the second weldment (5), to be laid to put the through holes (12) of the first weldment (4) upon the holes (5') of the second weldment (5), to insert welding rod (13) of high rigidity and low melting point into the holes (12,5') and to irradiate $CO_2$ CW laser beam (10) from the $CO_2$ laser generator (9) with concentrating the laser beam (10) through condenser lens (8) on the interface (14) of the two weldments. In this case the welding rod (13) melts by laser heat and penetrates into the part of the interface (14) of the two weldments to be welded.

The unexplained numeral (11) is the reflecting mirror. It is proved that welding rigidity according to this invention is 10 times larger than the welding ridigity according to the prior art, by shock test.

For welding the same size of steel ingot, welding whose rigidity is 10 times larger than prior art is available with less laser power than the prior art and in shorter times than the prior art. In the case of welding of steel plates according to this invention has the effects of non-distortion and high quality.

What is claimed is:

1. A laser welding method of steel plate and steel ingot which is characterized for the steel plates less than 1 mm thick, to make several through holes (1') whose diameter is less than 1 mm, to fix the first weldment (1) under the second weldment (2), and to irradiate laser beam (7) of Nd-YAG laser generator (6) through condensing lens (8) and holes (1') on the surface of the second weldment (2) to be welded.

2. A laser welding method of steel plate and steel ingot which is characterized, for the steel ingot more than 1 mm thick, to make narrow slit (4') penetrating the first weldment (4), to fix the first weldment (4) on the second weldment (5), and to irradiate $CO_2$ CW laser beam (10) of $CO_2$ laser generator (9) through condensing lens (8) and slit (4') on the second weldment (5) to be welded.

3. A laser welding method of steel plate and steel ingot according to claim 2, which is characterized, to make through holes (12) on the first weldment (4) and holes (5') with 1/10 depth of the thickness of second weldment (5), to fix the first weldment (4) and the second weldment in which the through holes (12) coincides with holes (5'), to insert the welding rod (13) into the through holes (12) and holes (5'), to irradiate $CO_2$ CW laser beam (10) of $CO_2$ laser generator (9) through the condenser lens (8) and the through holes (12) on the interface of the two weldment to be welded.

4. A laser welding method of steel plate and steel ingot according to claim 3, which is characterized in that the welding rod (13) is low melting point and high rigidity material.

* * * * *